United States Patent

Onishi et al.

[11] Patent Number: 5,986,425
[45] Date of Patent: Nov. 16, 1999

[54] NUMERICAL CONTROLLER

[75] Inventors: Yasushi Onishi, Fujiyoshida; Yoshiharu Saiki, Oshino-mura, both of Japan

[73] Assignee: Fanuc Ltd., Minamitsuru-gun, Japan

[21] Appl. No.: 09/011,705

[22] PCT Filed: Jun. 17, 1997

[86] PCT No.: PCT/JP97/02081

§ 371 Date: Feb. 17, 1998

§ 102(e) Date: Feb. 17, 1998

[87] PCT Pub. No.: WO97/49012

PCT Pub. Date: Dec. 24, 1997

[30] Foreign Application Priority Data

Jun. 17, 1996 [JP] Japan ................................ 8-175457

[51] Int. Cl.$^6$ ........................................... G05B 19/18
[52] U.S. Cl. .................................. 318/569; 318/567
[58] Field of Search ........................... 318/560, 567, 318/568.1, 568.11, 568.13, 569, 572, 600

[56] References Cited

U.S. PATENT DOCUMENTS

| 4,396,984 | 8/1983 | Videki, II | 364/200 |
|---|---|---|---|
| 4,633,385 | 12/1986 | Murata et al. | 364/191 |
| 4,788,481 | 11/1988 | Niwa | 318/600 |
| 4,902,951 | 2/1990 | Ohta et al. | 318/632 |
| 4,931,709 | 6/1990 | Ikeda et al. | 318/567 |
| 4,961,041 | 10/1990 | Seki et al. | 318/578 |
| 5,140,237 | 8/1992 | Sasaki et al. | 318/569 |

FOREIGN PATENT DOCUMENTS

| 3-189704 | 8/1991 | Japan . |
|---|---|---|
| 8-286717 | 11/1996 | Japan . |

*Primary Examiner*—Robert E. Nappi
*Assistant Examiner*—Rina I. Duda
*Attorney, Agent, or Firm*—Staas & Halsey

[57] ABSTRACT

A CNC apparatus (10), wherein a PC circuit (300) for sequence control of a peripheral device is provided in addition to a PC circuit (200) for sequence control of a machine (60) to be numerical controlled. The sequence programs executed by the respective PC circuits are made capable of independently inputting to and outputting from EEPROMs (240, 340) and also made capable of independently editing and diagnosing. Further, signal transmission and reception between the PC circuits (200 and 300) so that both the sequence programs can be executed coordinately with each other.

20 Claims, 9 Drawing Sheets

NUMERICAL CONTROLLER

BACKGROUND OF THE INVENTION

1. Technical Field

The present invention relates to a numerical control apparatus for controlling a machine tool or the like.

2. Description of the Related Art

A numerical control apparatus (hereinafter referred to as "CNC apparatus") for controlling a machine tool or the like incorporates a programmable controller (hereinafter referred to as "PC") which performs sequence control. Such sequence control is performed by receiving auxiliary function signals (M function signal, T function signal) transmitted from a numerical control section and signals (cycle start signal, feed hold signal or the like) transmitted from the machine. Thereby control of the machine in cooperation with a processor of the numerical control section is performed.

On the other hand, there has recently been an increasing number of cases where a peripheral device, such as a loader used to load a work into a machine tool, a pallet changer or the like, is added to the machine tool as an option. In many of such cases, however, it is becoming necessary for the devices other than main machines such as machine tools to be sequence-controlled: Furthermore, such sequence controls need to be performed in cooperation with those for the CNC apparatus.

Conventionally, the following methods are adopted for performing sequence control on the peripheral device.

(1) executing the sequence control of the peripheral device also by a PC incorporated into the CNC apparatus.

(2) executing the sequence control of the peripheral device by a programmable controller connected to a separate external CNC apparatus.

The sequence program of the peripheral device has less independency and therefore must be interlocked with the operation of the CNC apparatus. For this reason, in order for the sequence program of the peripheral device to be executed by the PC incorporated into the CNC apparatus according the above method (1), it is necessary for the sequence program of the peripheral device to be incorporated into the sequence program specific to the PC in order to be connected therewith. Accordingly, the procedure for this incorporation becomes complex for a dealer or user, other than a designer of the sequence program of the CNC apparatus, in modifying or incorporating the sequence program of the peripheral device to be used as an option.

An attempt to alter an existing sequence program, by anyone who is not a designer of the sequence program specific to the CNC apparatus and not familiar with the sequence program, in order to incorporate thereinto the sequence program of the peripheral device, is likely to end up with errors because of his being unfamiliar with the programming procedure. Incorporation of an erroneous program leads to destruction of not only the sequence program of the peripheral device but also the primary sequence program, giving rise to an erroneous operation of the machine. This remarkably deteriorates the reliability of the system. Furthermore, in order to correct the mis-programming, it is necessary to correct also the primary sequence program, with the result that the correcting operation becomes very difficult to perform.

On the other hand, the above method (2) is free of the problems with the above method (1). However, it becomes necessary to provide what is otherwise unnecessary, such as a wiring for making connection between the PC incorporated into the CNC apparatus and an external programmable controller connected to the CNC apparatus, a main body of the external programmable controller, a power source for driving this main body, a locker for providing necessary space, and the like. Moreover, since development procedures of the editing function, diagnosis function, etc. (needed for developing the sequence program of the external programmable controller) differ, there arises the problem that the system development efficiency will decline.

SUMMARY OF THE INVENTION

An object of the present invention is to provide a CNC apparatus which makes it easy to incorporate the sequence program of the peripheral device and also makes it easy to perform a correcting operation for mis-programming. Another object of the present invention is to provide a CNC apparatus which also facilitates easy inputting/outputting, editing, and diagnosis of the sequence program.

To attain the above object, one embodiment of numerical control apparatus according to the present invention is equipped with storing means for storing a sequence program for performing sequence control of a machine to be numerically controlled and a sequence program for performing sequence control of a peripheral device operating in coordination with the machine, thereby performing sequence control and numerical control of the machine, as well as the sequence control of the peripheral device in coordination with the operation of the machine.

Further, another form of numerical control apparatus according to the present invention is equipped with storing means for storing a plurality of sequence programs, program executing means for executing a plurality of sequence programs, selecting means for selecting one of the plurality of the sequence programs, diagnosing means for displaying the contents and executed state of the selected sequence program, and editing means for performing editing and inputting/outputting of the selected sequence program.

Further, still another form of numerical control apparatus according to the present invention is equipped with storing means for storing a sequence program for performing sequence control of a machine to be numerically controlled and a sequence program for performing sequence control of a peripheral device operating in coordination with the operation of the machine, program executing means for executing the respective sequence programs, signal transmitting/receiving means, for transmitting and receiving an interface signal between the numerical control section and the program executing means, designed to coordinate the numerical control of the machine with the execution of the sequence program for performing sequence control of the machine, signal transmitting/receiving means, for transmitting and receiving an interface signal, designed to coordinate the execution of the sequence program for performing sequence control of the machine with the execution of the sequence program for performing sequence control of the peripheral device, selecting means for selecting one of the sequence programs, diagnosing means for displaying the contents and the executed state of the selected sequence program, and editing means for performing editing and inputting/outputting of the selected sequence program.

As described in the foregoing, in the present invention, a plurality of the sequence programs are stored within the CNC apparatus and the respective sequence programs are designed to be executed in coordination with each other, so that both the sequence control of the machine to be numerically controlled and the sequence control of the peripheral device associated with the operation of this machine can be performed by the CNC apparatus alone. In addition, not only the respective sequence programs are independently stored but also inputted/outputted, editing and diagnosis of each sequence program can be performed selectively, so that there is no possibility such that, when modifying any one sequence program, the other sequence program is changed by mistake or the like. Therefore, the safety in this respect is ensured.

PREFERRED EMBODIMENTS OF THE INVENTION

Figure 1:
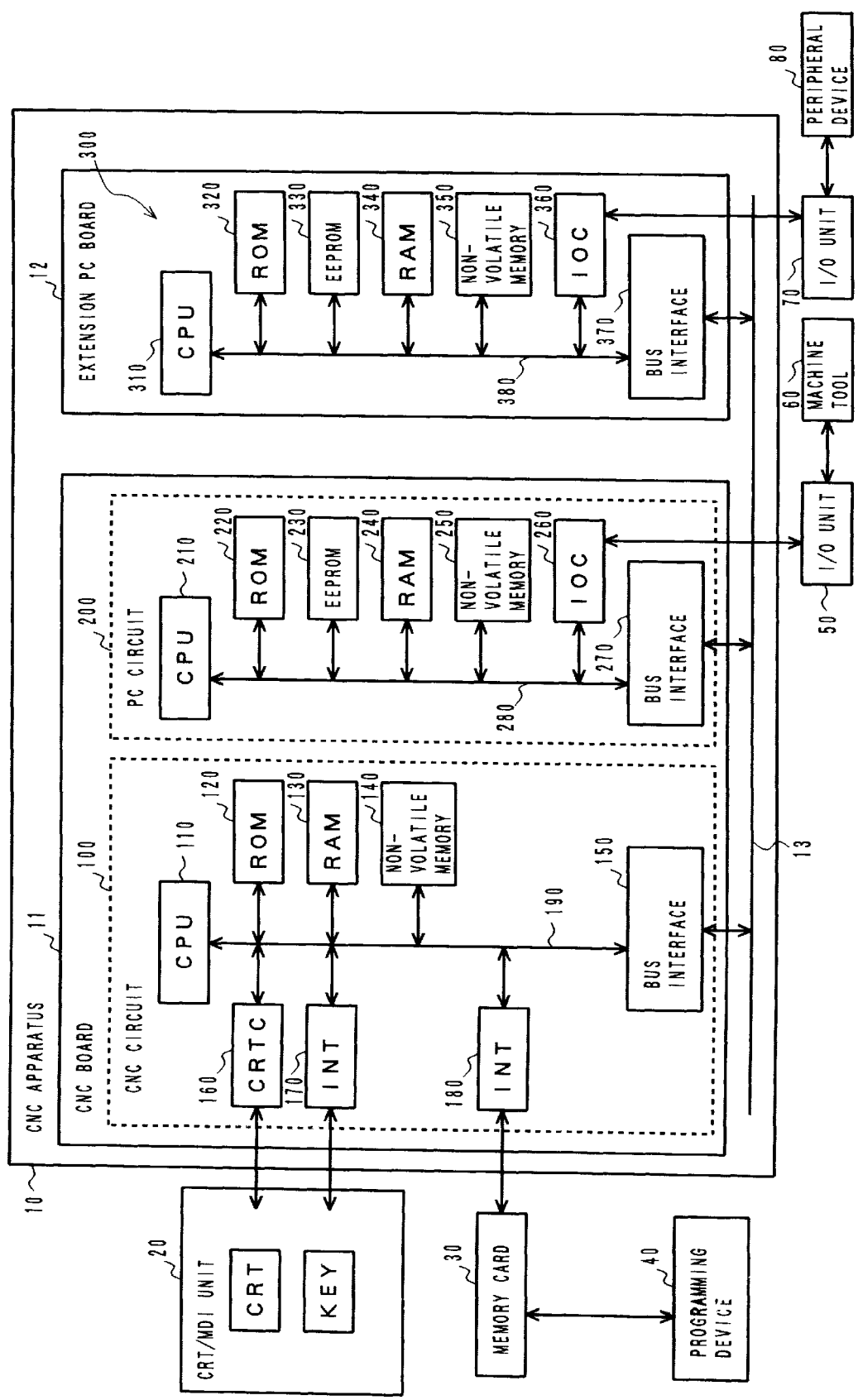
FIG. 1 is a block diagram illustrating a CNC apparatus according to an embodiment of the present invention.

First, a CNC apparatus 10 will be explained with reference to a block diagram of FIG. 1.

The CNC apparatus 10 is provided with an extension PC board 12 as well as a CNC board 11. As in the case of the conventional CNC apparatus, this CNC board 11 is provided with a CNC circuit 100 and a PC circuit 200 for performing sequence control of a main body of a machine tool. On the other hand, the extension PC board 12 is provided with a PC circuit 300 for performing sequence control of a peripheral device. That is, the CNC apparatus 10 of FIG. 1 differs from the conventional CNC apparatus in that it is equipped with the extension PC board 12.

Hereinafter, the PC circuit 200 for performing sequence control of the main body of the machine tool is referred to as "a first PC circuit" and the PC circuit 300 for performing sequence control of the peripheral device is referred to as "a second PC circuit".

The CNC circuit 100 has a processor 110. To this processor 110 there are connected, through a local bus 190, a ROM 120, a RAM 130, a non-volatile memory 140, a CRT controller 160 for controlling a CRT display device of a CRT/MDI unit 20, an interface 170 connected to a keyboard of the CRT/MDI unit 20 and an interface 180 for a memory card 30. The local bus 190 is connected to a global bus 13 through a bus interface 150. The memory card 30 stores therein an NC program and a sequence program created by a programming device 40. As described later, the sequence programs are read in from the memory card 30. Although the CNC circuit 100 has a shaft control circuit for driving and controlling a motor for driving a main shaft and respective feed shafts of a machine tool 60, since such shaft control circuit has no direct relevancy to the invention of this patent application, the illustration thereof is omitted.

To a processor 210 of the first PC circuit 200 there are connected, through a local bus 280, a ROM 220, an EEPROM (Electrically Erasable Programmable ROM) 230, a RAM 240, a non-volatile memory 250 and an inputting/outputting circuit 260. Also, the local bus 280 is connected to the global bus 13 through a bus interface 270. The inputting/outputting circuit 260 is connected to various actuators and sensors of a machine tool main unit 60 through an I/O unit 50.

As in the case of the first PC circuit 200, to a processor 310 of the second PC circuit 300 there are connected, through a local bus 380, a ROM 320, an EEPROM 330, a RAM 340, a non-volatile memory 350 and an inputting/outputting circuit 360. The local bus 380 is connected to the global bus 13 through a bus interface 370. The inputting/outputting circuit 360 is connected to various actuators and sensors of a peripheral device 80 through an I/O unit 70.

Figure 2:
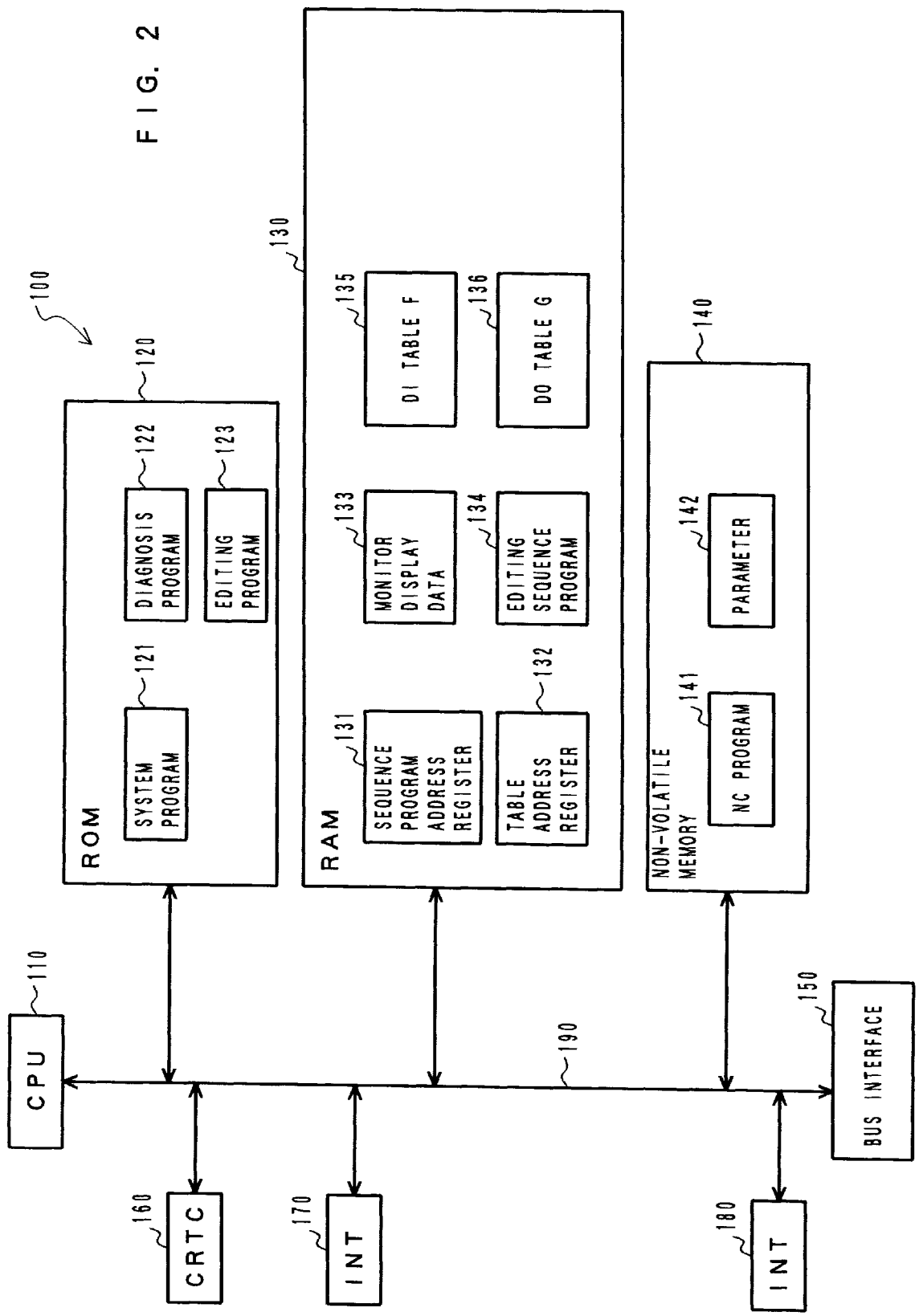
FIG. 2 is a diagram illustrating programs, data, etc. stored in respective memories of the CNC apparatus according to the embodiment of the present invention.

Here, the programs, data, etc. which are stored in the respective memories of the CNC circuit 100 will be explained with reference to FIG. 2.

In the ROM 120 there are stored a diagnosing program 122 and an editing program 123, such as a sequence program as described later, as well as a system program 121 for controlling the CNC apparatus.

Also, the RAM 130 is provided with a register 131 for storing addresses of storing means for storing the sequence programs to be executed for diagnosing and editing, and a register 132 for storing addresses of various tables. An area 133 of the RAM 130 is for storing data to be displayed on a CRT screen of the CRT/MDI unit 20, and an area 134 is for storing the sequence program for use in editing. A DI table F 135 is for storing output signals from the first PC circuit 200 and a DO table G 136 is for storing input signals from the first PC circuit, both serving as signal transmitting/receiving means for transmitting and receiving interface signals between the first PC circuit 200 and the CNC circuit 100.

The non-volatile memory 140 stores therein not only an NC program 141 inputted thereto, but also data corresponding to various parameters 142 which have been set along with the NC program.

Figure 3:
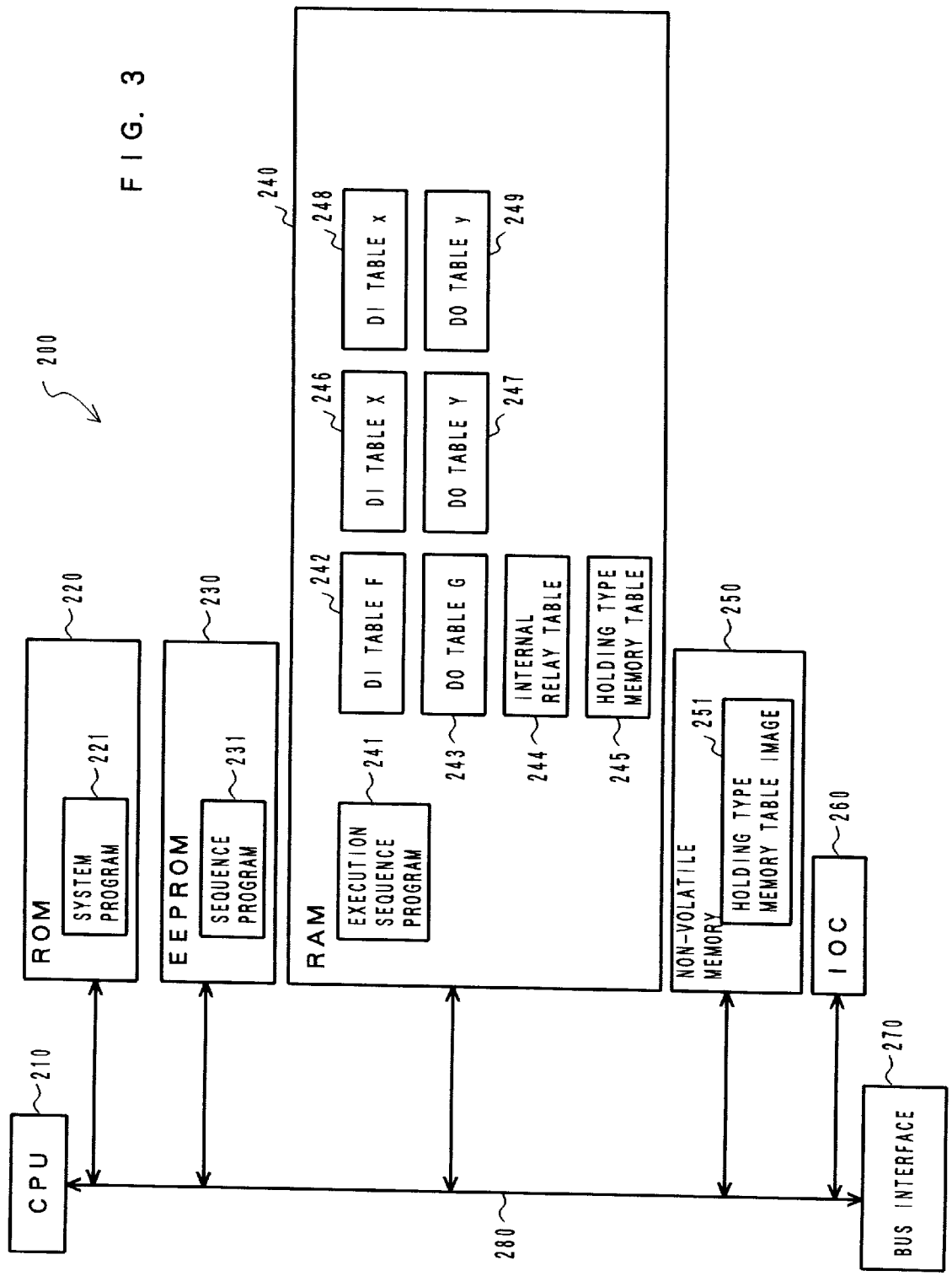
FIG. 3 is a diagram illustrating programs, data, etc. stored in respective memories of a first PC circuit according to the embodiment of the present invention.

Next, the programs, data, etc. which are stored in the respective memories of the first PC circuit will be explained with reference to FIG. 3.

The ROM 220 stores therein a system program 221 for a processor 210 of the first PC circuit, and the EEPROM 230 stores therein a sequence program 231 which is to be executed by the first PC circuit 200. For execution, the processor 10 reads the sequence program 231 from the EEPROM 230, stores it into the RAM 240, and sequentially executes the execution sequence program 241 stored in the RAM 240. Also, the RAM 240 is provided with a DI table F 242 for storing signals outputted from the CNC circuit 100 and inputted to the first PC circuit 200 and a DO table G 243 for storing output signals outputted from the first PC circuit 200 to the CNC circuit 100. Both table F 242 and G 243 serve transmitting/receiving means for transmitting and receiving interface signals between the first PC circuit and the CNC circuit 100.

The RAM 240 is further provided with an internal relay table 244 for storing the state of internal relays in the sequence program, and a holding type memory table 245 for storing the state of holding type memories such as a variable timer, a counter, a keep relay, or the like. Also provided are a DI table X 246 for storing an input signal from the machine tool and a DO table Y 247 for storing an output signal from the first PC circuit 200 to the machine tool 60, both serving as tables for storing interface signals between the first PC circuit 200 and the machine tool. Further, the RAM 240 is provided with a DI table x 248 for storing input signals from the second PC circuit 300 and a DO table y 249 for storing output signals from the first PC circuit 200 to the second PC circuit 300, both serving as signal transmitting/receiving means for transmitting and receiving the interface signals between the first PC circuit 200 and the second PC circuit 300.

In order to back up the data of the holding type memory table 245, data stored in the holding type memory table 245 are stored in the non-volatile memory 250 as holding type memory table images 251.

The construction of the first PC circuit 200 differs from that of the PC circuit of the conventional CNC apparatus 10 only in that the RAM 240 is provided with the DI table x 248 for storing the input signals from the second PC circuit 300 and the DO table y 249 for storing the output signals from the first PC circuit 200 to the second PC circuit 300. Table x 248 and table y 249 permit transmission and reception of the interface signals between the first and the second PC circuit.

Figure 4:
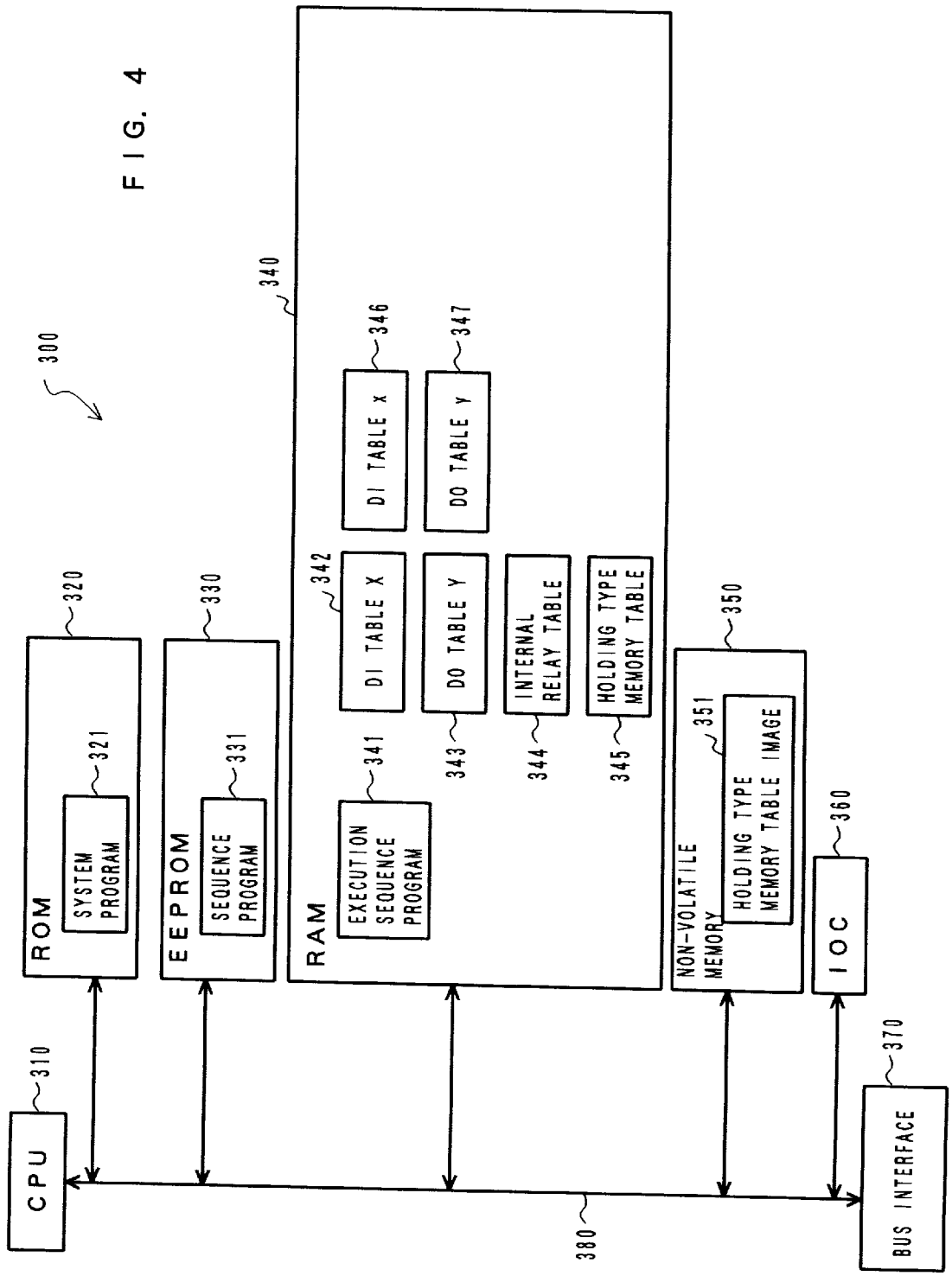
FIG. 4 is a diagram illustrating programs, data, etc. stored in respective memories of a second PC circuit according to the embodiment of the present invention.

Next, the programs, data, etc. which are stored in the respective memories of the second PC circuit will be explained with reference to FIG. 4.

The ROM 320 stores therein a system program 321 for a processor 310 of the second PC circuit 300. The EEPROM 330 stores therein a sequence program 331 according to which the second PC circuit 300 controls the peripheral device 80. When the processor 310 executes the sequence program 331, this program is read into the RAM 340, and the sequence program 341 thus read in is executed.

Also, the RAM 340 is provided with a DI table X 342 for storing input signals from the peripheral device 80 and a DO table Y 343 for storing output signals outputted from the second PC circuit 300 to the peripheral device 80, both serving as tables for storing interface signals between the second PC circuit 300 and the peripheral device 80. The RAM 340 is further provided with a table 344 for storing the contents of the internal relays in the sequence program 341 and a table 345 for storing type memory table 245 for storing the state of holding type memories. Further, the RAM 340 is further provided with a DI table x 346 for storing signals inputted from the first PC circuit 200 and a DO table y 347 for storing signal outputted from the second PC circuit 300 to the first PC circuit 200. Both table x 346 and table y 347 serve as signal transmitting/receiving means for transmitting and receiving interface signals between the second PC circuit 300 and the first PC circuit 200.

In order to back up the data of the holding type memory table 345, data items stored in the holding type memory table 345 are stored as holding type memory table images 351 in the non-volatile memory 350.

Figure 5:
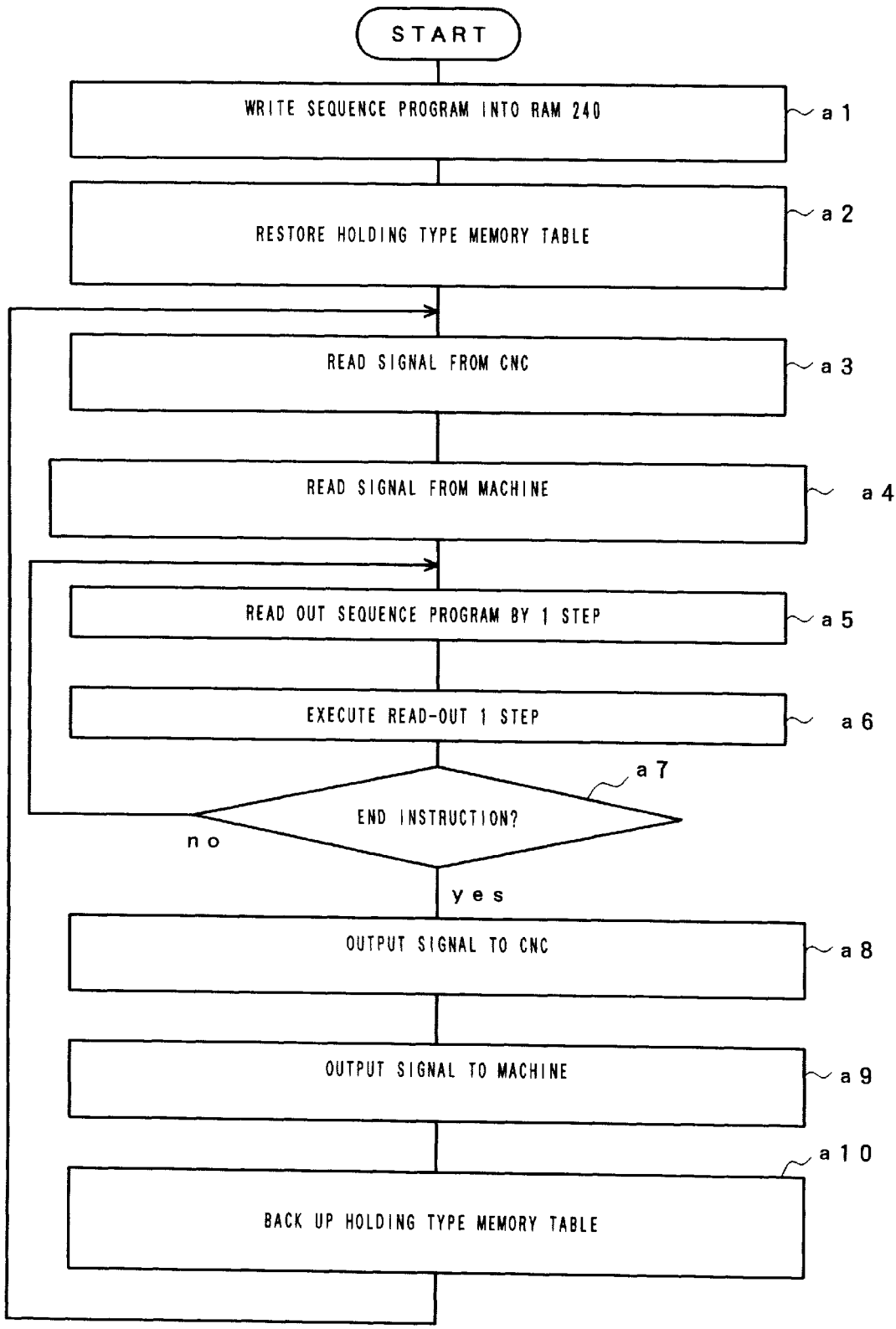
FIG. 5 is a flow chart illustrating the processing to be executed by a processor of the first PC circuit according to the embodiment of the present invention.

Next, the processing to be executed by the processor 210 of the first PC circuit 200 when a command to operate the CNC apparatus 10 is inputted thereto will be explained with reference to the flow chart of FIG. 5.

First, the processor 210 reads the sequence program 231 stored in the EEPROM 230 and writes it into the execution sequence program (241) area of the RAM 240 (step a1), and then writes the data 251 of the holding type memory table image of the non-volatile memory 250 into the holding type memory table 245 of the RAM 240 to thereby restore the states of the variable timer, counter, keep relay, etc. to their original states (step a2).

Next, the processor 210 takes in the output signal that is outputted from the CNC circuit 100 to the first PC circuit 200. That is, the processor 210 copies the state of the DI table F 135 of the RAM 130 of the CNC circuit 100 into the DI table F 242 of the RAM 240 (step a3). Further, the processor 210 reads the state of the input signal of the I/O unit 50 from the inputting/outputting circuit 260 and writes it into the DI table X 246 of the RAM 240 (step a4).

In addition, the processor 210 reads an initial step of the sequence program 241 stored in the RAM 240, executes the thus-read sequence program step according to the data of the DI table F 242, DI table X 246, DI table x 248, internal relay table 244 and holding type memory table 245. The results of the execution are written into the DO table G 243, DO table Y 247, DO table y 249, internal relay table 244 and holding type memory table 245 (steps a5 and a6).

That is, the processor 210 executes one step of the read sequence program according to the signal (DI table F 242) inputted from the CNC circuit 100, the signal (DI table X 246) inputted from the machine tool and the signal (DI table x 248) inputted from the second PC circuit 300. The processor 210 writes the corresponding executed result into the DO table G 243 if it is necessary to modify the signal that is to be outputted to the CNC circuit 100; writes the corresponding executed result into the DO table Y 247 if it is necessary to modify the signal that is to be outputted to the machine tool 60; writes the corresponding executed result into the DO table y 249 if it is necessary to modify the signal that is to be outputted to the second PC circuit 300; and, writes the corresponding executed results into the tables 244 and 245, respectively if it is necessary to modify the state of the internal relay and the state of the holding type memory.

It is also determined whether or not the instruction of one step of the sequence program which was read and analyzed in step a5 is an instruction for ending one sequence (step a7). If it is not an instruction for the end, the processing returns to step a5, whereby the processings from step a5 to step a7 are repeatedly executed until an instruction for ending one-sequence operation is read out.

When an instruction for ending is read, the processor 210 copies the contents of the DO table G 243 in the RAM 240 of the first PC circuit 200 into the DO table G 136 of the RAM 130 of the CNC circuit 100 (step a8), and simultaneously copies the state of the DO table Y 247 into the inputting/outputting circuit 260 to thereby make the state of the output signal of the I/O unit 50 the same as the state for being stored in the table Y 247 (step a9). Further, the processor 210 copies the contents of the holding type memory table 245 of the RAM 240 into the holding type memory table image area (251) of the non-volatile memory 250, to thereby back up the contents of the holding type memory table 245 (step a10). Then, the processing operation returns to step a3, whereby the above-mentioned step a3 and succeeding steps of the processing are repeatedly executed.

As a result, the state of the output signal from the first PC circuit 200 is stored in the DO table G 136 of the RAM 130 of the CNC circuit 100, so that the processor 110 of the CNC circuit 100 distributes commands among respective shafts of the machine tool 60, etc. for their numerical control according to the data of this DO table G 136 and the NC program.

Also, the processor 110 writes the command to the first PC circuit 200 into the DI table F 135. Further, in step a9, a command for machine tool control is issued from the first PC circuit 200 to control the machine tool 60, thereby performing machining of a work.

Figure 6:
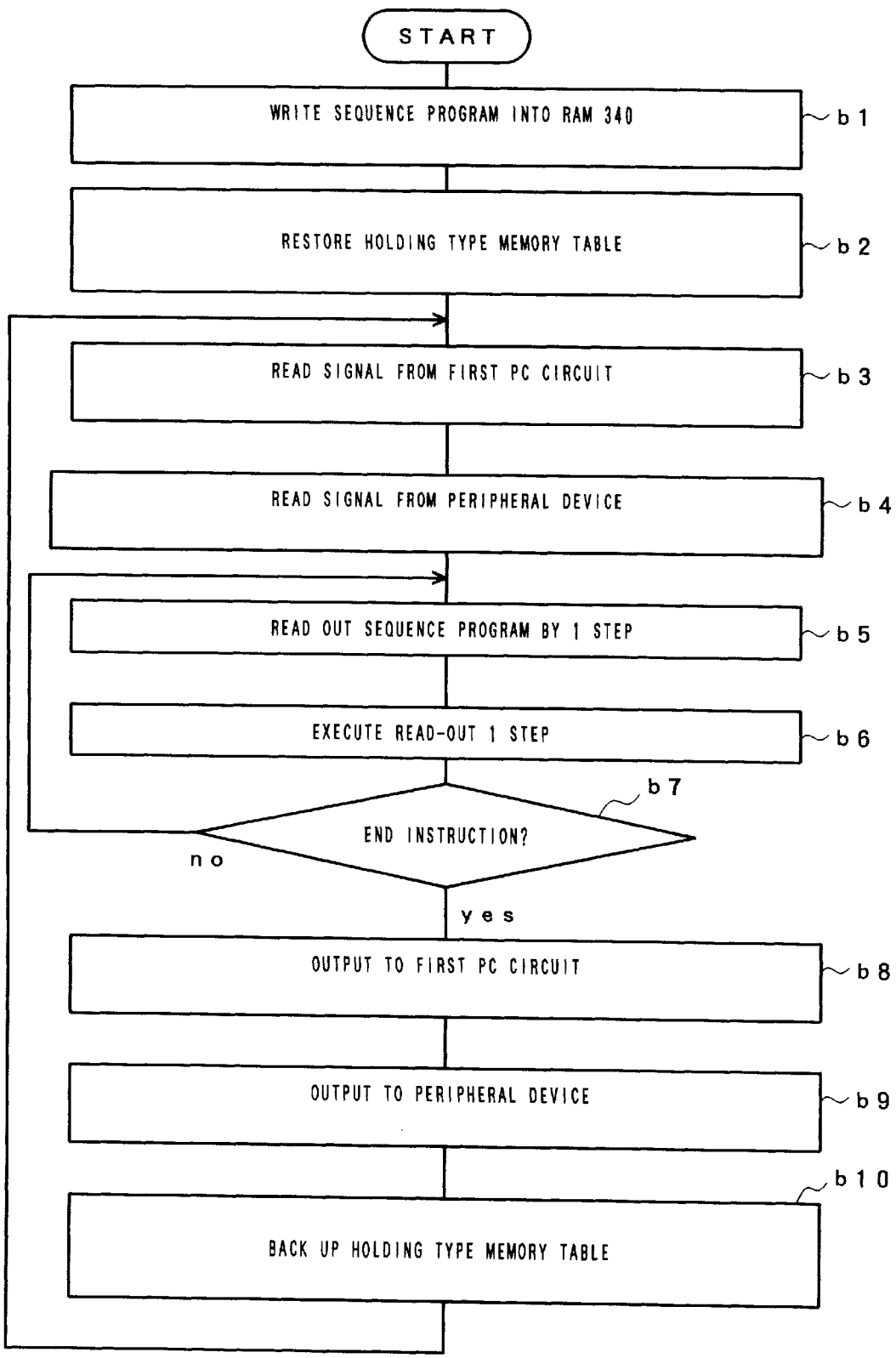
FIG. 6 is a flow chart illustrating the processing to be executed by a processor of the second PC circuit according to the embodiment of the present invention.

Here, the processing to be executed by the processor 310 of the second PC circuit 300 when a command to operate the CNC apparatus 10 is inputted thereto will be explained with reference to a flow chart of FIG. 6.

The processor 310 reads the sequence program 331 stored in the EEPROM 330 and writes it into the execution sequence program (341) area of the RAM 340 (step b1), and writes the data of the holding memory table image 351 of the non-volatile memory 350 into the holding memory table 345 of the RAM 340 to thereby restore the variable timer, counter, keep relay, etc. to their respective original states (step b2).

Next, the processor 310 reads in the signals that are outputted from the first PC circuit 200 to the second PC circuit 300. That is, the processor 310 copies the state of the DO table y 249 of the RAM 240 of the first PC circuit 200 into the DI table x 346 of the RAM 340 (step b3) and also reads the state of the input signals of the I/O unit 70 from the inputting/outputting circuit 360 and writes it into the DI table X 342 of the RAM 340 (step b4). The processor 310 also reads an initial step of the sequence program 341 stored in the RAM 340 and executes the thus-read sequence program step according to the data of the DI table X 342, DI table x 346, internal relay table 344 and holding type memory table 345 and writes the results of execution into the DO table Y 343, DO table y 347, internal relay table 344 and holding type memory table 345 (steps b5 and b6).

That is, the processor 310 executes one step of the read sequence program according to the signal (DI table x 346) inputted from the first PC circuit 200 and the signal (DI table X 342) inputted from the peripheral device. The processor 310 writes the corresponding executed result into the DO table Y 343 if it is necessary to modify the output signal to the peripheral device 80; writes the corresponding executed result into the DO table y 347 if it is necessary to modify the output signal to the first PC circuit 200; and, writes the corresponding executed results into the tables 344 and 345, respectively if it is necessary to modify the state of the internal relay and the state of the holding type memory.

Next, it is determined whether or not the instruction of the one step of the sequence program which was read and analyzed in step b5 is an instruction for ending the one sequence operation (step b7). If it is not an instruction for ending, the processing operation returns to step b5, whereby the processings from step b5 to step b7 are repeatedly executed until an instruction for ending, the one-sequence operation is read out. When an instruction for ending is read, the processor 310 copies the contents of the DO table y 347 in the RAM 340 of the second PC circuit 300 into the DI table x 248 of the RAM 240 of the first PC circuit 200 (step b8) and simultaneously copies the state of the DO table Y 343 into the inputting/outputting circuit 360. Thereby, make the state of the output signal of the I/O unit 70 is made the same as the state stored in the table y 347 (step b9). Further, the processor 310 copies the contents of the holding type memory table 345 of the RAM 340 into the holding type memory table image area (351) of the non-volatile memory 350, to thereby back up the contents of the holding type memory 345 (step b10). Then, the processing operation returns to step b3 to repeat the above-mentioned step b3 and succeeding steps.

As a result, it follows that the state of the output signal from the second PC circuit 300 is stored in the DI table x 248 in the RAM 240 of the first PC circuit 200, so that the processor 210 of the first PC circuit 200 executes the above-mentioned processings according to this changed data of the DI table x 248. Also, in step b9, a command is issued from the second PC circuit 300 to the peripheral circuit 80, whereby the peripheral device 80 is sequence-controlled.

As described above, between the CNC circuit 100 and the first PC circuit 200, that is, between the tables F 135 and G 136 of the CNC circuit 100 and the tables F 242 and G 243 of the first PC circuit 200, signals are transmitted and received. Thereby the CNC circuit 100 and the first PC circuit 200 are coordinated to control the machine tool 60. Further, between the first PC circuit 200 and the second PC circuit 300, that is, between the tables x 248 and y 249 of the first PC circuit and the tables x 346 and y 347 of the second PC circuit 300, signals are transmitted and received. Thereby the first PC circuit 200 and the second PC circuit 300 coordinately drive and control the machine tool 60 and the peripheral device 80. By doing so, the CNC circuit 100, first PC circuit 200 and second PC circuit 300 coordinately and cooperatively drive and control the machine tool 60 and the peripheral device 80.

Figure 7:
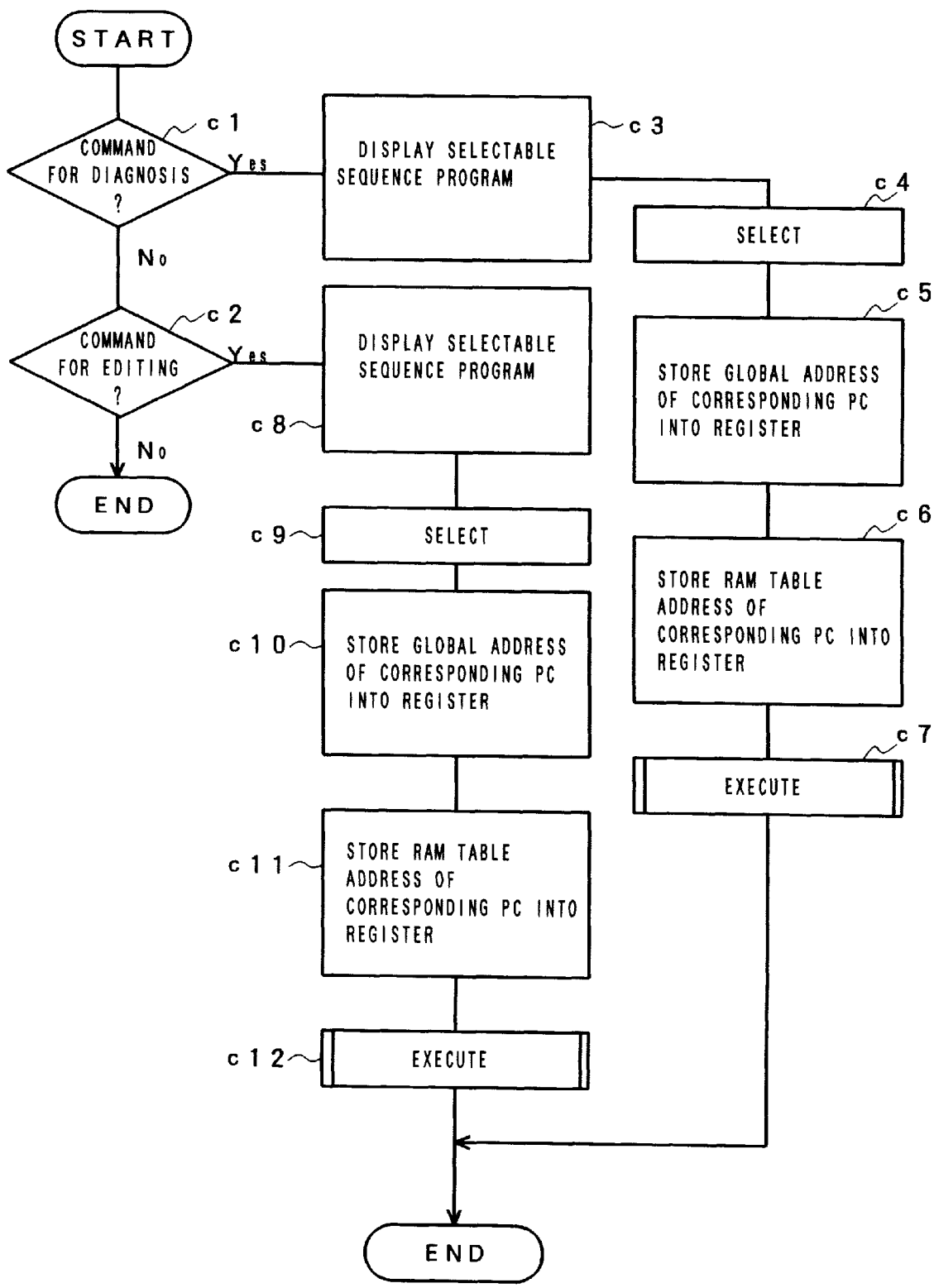
FIG. 7 is a flow chart illustrating diagnostic and editing processings according to the embodiment of the present invention.

Next, the editing/diagnosing processings executed by the CNC apparatus 10 will be explained with reference to a flow chart of FIG. 7.

The processor 110 of the CNC circuit 100 periodically determines whether a diagnosis command is inputted or an editing command is inputted (step c1 and step c2). When an editing command is inputted by means of, for example, an editing command key, the processing operation is switched to an editing mode, and the processor 110 first displays so as for an operator to select which one of the sequence program for the first PC circuit 200 or the sequence program for the second PC circuit 300 is to be edited. When selection is made (steps c8 and c9), the processor 110 stores the global addresses of the EEPROM (230 or 330) of the PC circuit, in which the selected sequence program is stored into the sequence program address register 131 in the RAM 130. The processor 110 also stores the addresses of the respective tables of the RAM (240 or 340) of the PC circuit which executes the selected sequence program into the table address register 132.

That is, when the sequence program of the first PC circuit 200 is selected, the global addresses of the EEPROM 230 are written into the sequence program address register 131, and the respective foremost addresses of the DI tables F 242, X 246, and x 248, DO tables G 243, Y 247, and y 249, internal relay table 244 and holding type memory table 245 are written into the table address register 132. On the other hand, when the sequence program of the second PC circuit 300 is selected, the global addresses of the EEPROM 330 are written into the sequence program address register 131, and the respective foremost addresses of the DI tables X 342 and x 346, DO tables Y 343 and y 347, internal relay table 344 and holding type memory table 345 are written into the table address register 132 (steps c10 and c11). Then, the editing program 123 stored in the ROM 120 is executed (step c12).

Figure 8:
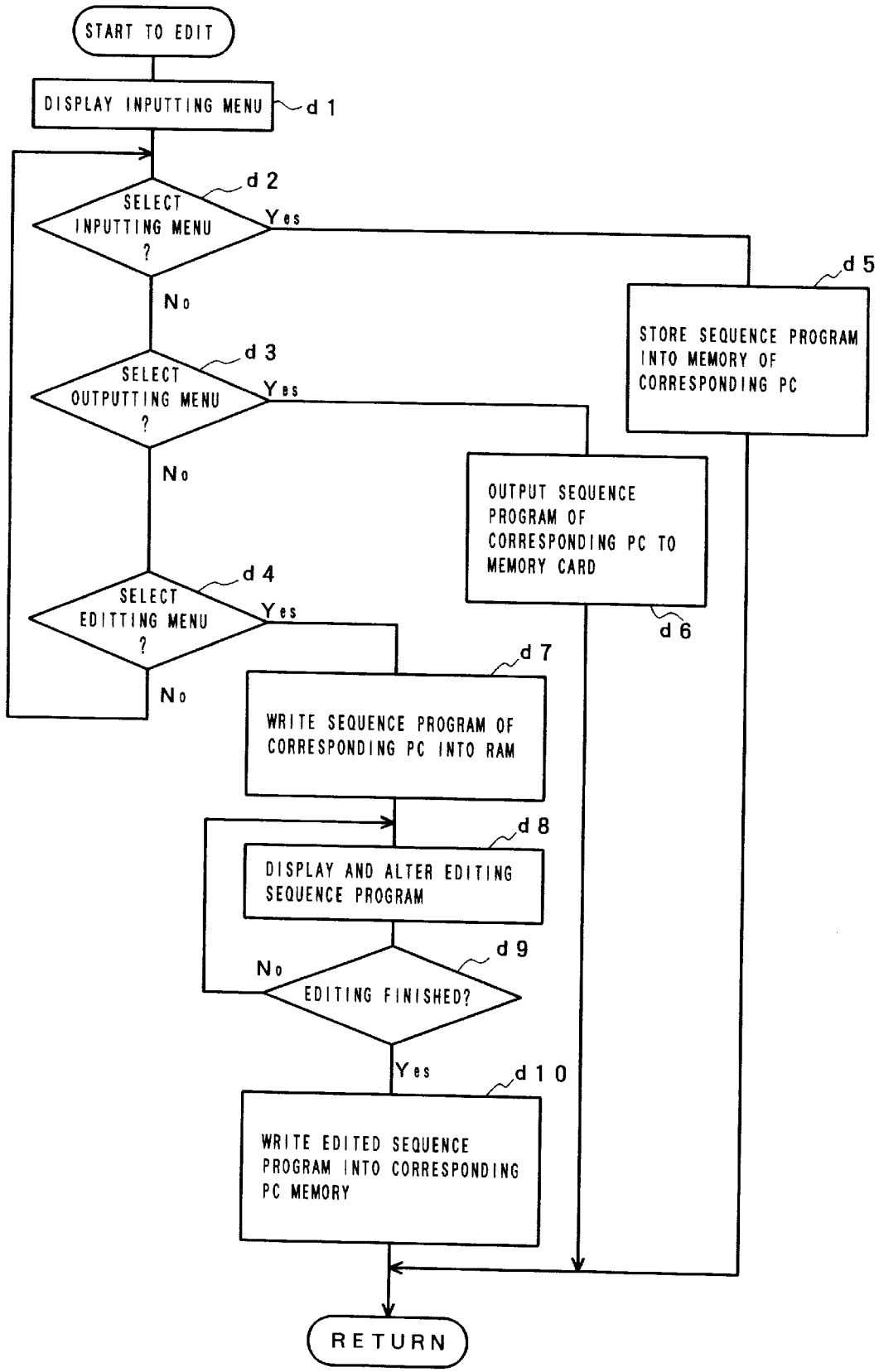
FIG. 8 is a flow chart illustrating the editing processing of the flow chart.

The editing processing to be executed according to the editing program 123 will be explained with reference to the flow chart of FIG. 8.

First, the processor 110 displays an inputting menu on the CRT screen of the CRT/MDI unit 20 and waits until one of an inputting menu, an outputting menu and an editing menu is selected (steps d1 to d4). When the inputting menu is selected, in step c10, the sequence program stored in the memory card 30 is inputted, via the memory card interface 180, to the sequence program memory (EEPROM 230 or 330) corresponding to the global address stored in the sequence program address register 131, thereby ending the inputting processing (step d5).

When the outputting menu is selected (step d3) instead of the inputting menu, the sequence program stored in the sequence program memory (EEPROM 230 or 330) corresponding to the global address indicated by the sequence program address register 131 is outputted, via the memory card interface 180, to the memory card 30, thereby ending the outputting processing (step d6).

Also, when the editing menu is selected (step d4), the processor 110 writes the sequence program stored in the sequence program memory (EEPROM 230 or 330) designated by the global address stored in the sequence program address register 131 into the editing sequence program area 134 of the RAM 130, and, according to the editing operation, sequentially displays onto the CRT screen the sequence program stored in the editing sequence program area 134 and alters the sequence program to thereby permit the program editing to be executed until a command to end the editing is inputted (steps d7 to d9). Upon completion of the editing operation, the processor 110 stores the edited sequence program stored in the editing sequence program area 134 into the sequence program memory designated by the sequence program address register 131 (step d10), thereby ending the edit processing.

As described above, since the sequence program for use in the first PC circuit or the sequence program for use in the second PC circuit can be individually stored into the memory (EEPROM 230 or 330) and can be individually outputted, for example, to the memory card 30 and the like and further can be individually edited, it does not happen that when modifying one of the sequence programs, the other thereof is altered erroneously, with the result that the safety is ensured.

Returning to FIG. 7, when a command for diagnosis is inputted (step c1), as in the case of the above-mentioned step c8, display is made for requiring an operator to select either sequence program for the first PC circuit 200 or sequence program for the second PC circuit 300. When either one of them has been selected, as in the case of the above-mentioned steps c10 and c11, the processor 110 stores the global addresses of the EEPROM (230 or 330) of the PC circuit, in which the selected sequence program is stored, into the sequence program address register 131 in the RAM 130, and also stores the addresses of the respective tables of the RAM (240 or 340) of the PC circuit which executes the selected program into the table address register 132 of the RAM 130 (step c3 to c6).

Figure 9:
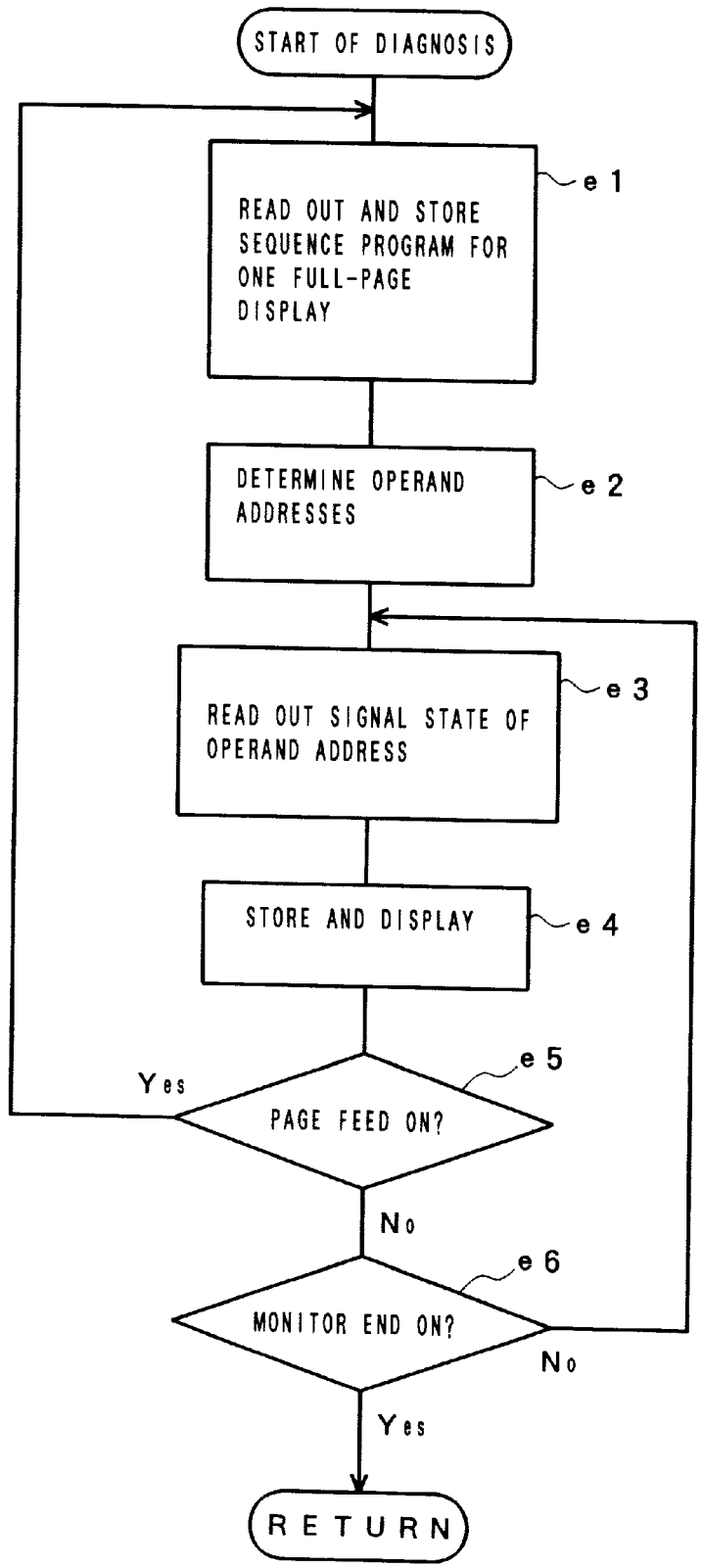
FIG. 9 is a flow chart illustrating the diagnostic processing of the flow chart.

And the processor 110 executes the diagnosing program 122 stored in the ROM 120 (step c7). This diagnosing program 122 is executed according to the processing of FIG. 9. The sequence program stored in the sequence program memory (EEPROM 230 or 330) designated by the global address stored in the sequence program address register 131 is read out by an amount corresponding to one page (one full-screen page) capable of being displayed on the CRT screen and stores this sequence program into a monitor display data memory area by converting it to graphic display data (ladder diagram) (step e1). Next, the processor 110 decodes the thus-read sequence program and determines the respective operand addresses (step e2). Then, the processor 110 reads out the states of the signals of the respective operand addresses from the respective tables designated by the table address register 132 and stores them into the monitor display data memory area of the RAM 130, thereby displaying the operational state of the sequence program graphically (by way of a ladder diagram) on the CRT screen (steps e3 and e4).

Next, the processor 110 determines whether a command for feeding a page is inputted or a command for ending the monitoring is inputted (steps e5 and e6). When a command for feeding a page is issued, the processing operation returns to step e1, and the next one-page sequence program is read out to execute the above-mentioned processings. Thereafter, by repeating the execution of these processing operations, the operational state of the selected sequence program (for use in the first PC circuit or for use in the second PC circuit) is sequentially displayed on the CRT screen in the form of a graphic diagram (ladder diagram), so that it is possible to diagnose the sequence program by studying such display.

Although in the above-explained embodiment of the present invention there is provided with the EEPROMs, one storing a sequence program for PC circuit, and the other storing a sequence program for the second PC circuit, it may be arranged without providing the EEPROMs respectively that the sequence program for use in the first PC circuit and that for use in the second PC circuit are separately stored in one EEPROM. Further, in the above-mentioned embodiment, it is arranged that the second PC circuit for the sequence control of the peripheral device is additionally provided in addition to the first PC circuit for the control of the main body of a machine (machine tool). However, if the processor of the first PC circuit for controlling the main body of the machine (machine tool) has sufficient controlling capacity to spare, the processor of the first PC circuit may also be used for the sequence control of the peripheral device. In this case too, the sequence program (the sequence program for the first PC circuit) for controlling the main body of the machine and the sequence program (the sequence program for the second PC circuit) for controlling the peripheral devices may be stored in separate memories, maintaining the independence from each other.

What is claimed is:

1. A numerical control apparatus, comprising:

storing means for storing a first sequence program for performing sequence control of a machine to be numerical controlled and a second sequence program for performing sequence control of a peripheral device operating in coordination with operation of the machine; and one or more signal storages for storing interface signals transmitted and received between a first process executing the first sequence program and a second process executing the second sequence program;

wherein the machine is sequence controlled and numerical controlled and the peripheral device is sequence controlled by said numerical control apparatus to coordinate operation of the peripheral device with mechanical operation of the machine.

2. A numerical control apparatus, comprising:

memory means for storing a plurality of sequence programs including a first sequence program for performing sequence control of a numerically controlled machine and a second sequence program for performing sequence control of a peripheral device operating in coordination with operation of the numerically controlled machine;

program executing means for executing the first and second sequence programs respectively;

one or more signal storages for storing interface signals transmitted and received between a first process executing the first sequence program and a second process executing the second sequence program;

selecting means for selecting one of the first and second sequence programs;

diagnosing means for displaying a content and executed state of the selected sequence program; and editing means for performing editing, inputting and outputting of the selected sequence program.

3. A numerical control apparatus, comprising:

storing means for storing a first sequence program for performing sequence control of a machine to be numerical controlled and a second sequence program for performing sequence control of a peripheral device operating in coordination with operation of the machine;

program executing means for executing the first and second sequence programs respectively by first and second execution processes;

a first signal storage for storing first interface signals transmitted and received between a numerical control section and said program executing means, coordination of the numerical control of the machine with the sequence control of the machine being performed in accordance with the first sequence program and using the first interface signals;

a second signal storage for storing second interface signals transmitted and received between the first and second execution processes, coordination of the sequence control of the machine with sequence control of the peripheral device being performed in accordance with the second sequence program and using the second interface signals;

selecting means for selecting one of the sequence programs;

diagnosing means for displaying a content and executed state of the selected sequence program; and editing means for performing editing, inputting and outputting of the selected sequence program.

4. A numerical control apparatus according to claim 3, wherein each of said first and second signal storages comprises storing means for storing an output signal from a first unit to a second unit and for storing an input signal from the second unit to the first unit, the first and second units being coupled to said signal storage.

5. A numerical control apparatus, comprising:

a numerical control circuit;

a first programmable controller circuit for performing sequence control of a machine to be numerically controlled; and a second programmable controller circuit for performing sequence control of a peripheral device;

wherein each of said first and said second programmable controller circuits comprises a CPU and a memory storing a sequence program executed under control of the CPU;

said numerical control apparatus further comprising signal transmitting and receiving means for performing signal transmission and reception under control of the CPUs, said signal transmitting and receiving means being provided between said numerical control circuit and said first programmable controller circuit and between said first programmable controller circuit and said second programmable controller circuit, respectively.

6. A numerical control apparatus according to claim 5, wherein:

said numerical control circuit comprises
  interfaces to a manual inputting device with a display screen and for connection to an external memory device, and
  a memory area for storing a program for editing and/or diagnosing the sequence programs; and the manual inputting device connected to the numerical control circuit can be switched between modes selected from
  a selecting mode for selecting either of the first sequence program and the second sequence program for editing or diagnosis,
  an inputting mode for storing the program stored in a storage medium of the external memory device into the memory of said first or said second programmable controller circuit selected according to the selecting mode,
  an outputting mode for storing the program stored in the memory of said first or said second programmable controller circuit selected according to the selecting mode into the storage medium of the external memory device,
  an editing mode for editing the program by the use of the display screen and storing the edited program into the memory of said first or said second programmable controller circuit selected according to the selecting mode, and
  a diagnosing mode for displaying the program stored in the memory of said first or said second programmable controller circuit selected according to the selecting mode onto the display screen in a form wherein an operator can understand the program.

7. A numerical control apparatus, comprising:

a first programmable controller coupled between a machine and a numerical controller performing numerical control of the machine, said first programmable controller storing interface signals for transmission therefrom and performing sequence control of the machine in accordance with a first sequence control program; and a second programmable controller coupled between said first programmable controller and a peripheral device operating in coordination with operation of the machine, said second programmable controller performing sequence control of the peripheral device in accordance with a second sequence program and the interface signals transmitted from said first programmable controller.

8. A numerical control apparatus according to claim 7, further comprising one or more signal storages for storing the interface signals in transit from said first programmable controller to said second programmable controller.

9. A numerical control apparatus according to claim 7, wherein:

said first programmable controller includes a first storage for storing the interface signals for transmission therefrom; and said second programmable controller includes a second storage for storing interface signals received from said first programmable controller.

10. A method of performing sequence control of a numerically controlled machine and sequence control of a peripheral device operating in coordination with the machine, the method comprising procedures for:

storing a first sequence program for performing sequence control of the numerically controlled machine and a second sequence program for performing sequence control of the peripheral device;

executing the first and second sequence programs;

storing interface signals indicating information for coordinating the sequence control of the peripheral device with the sequence control of the machine;

reading the stored second interface signals in accordance with the second sequence program;

selecting one of the sequence programs;

displaying a content and executed state of the selected sequence program; and performing editing, inputting and outputting of the selected sequence program.

11. A numerical control apparatus according to claim 1, wherein the peripheral device is mechanically coupled to the machine.

12. A numerical control apparatus according to claim 2, wherein the peripheral device is mechanically coupled to the machine.

13. A numerical control apparatus according to claim 3, wherein the peripheral device is mechanically coupled to the machine.

14. A numerical control apparatus according to claim 5, wherein the peripheral device is mechanically coupled to the machine.

15. A numerical control apparatus according to claim 7, wherein the peripheral device is mechanically coupled to the machine.

16. A numerical control apparatus according to claim 7, wherein:

said first programmable controller comprises a first programmable controller circuit; and said second programmable controller comprises a second programmable controller circuit.

17. A numerical control apparatus according to claim 1, wherein the peripheral device is one of a work loader and a pallet changer.

18. A numerical control apparatus according to claim 2, wherein the peripheral device is one of a work loader and a pallet changer.

19. A numerical control apparatus according to claim 3, wherein the peripheral device is one of a work loader and a pallet changer.

20. A numerical control apparatus according to claim 5, wherein the peripheral device is one of a work loader and a pallet changer.

* * * * *

UNITED STATES PATENT AND TRADEMARK OFFICE
CERTIFICATE OF CORRECTION

PATENT NO. : 5,986,425
DATED : November 16, 1999
INVENTOR(S) : Yasushi Onishi, et al.

It is certified that error appears in the above-identified patent and that said Letters Patent is hereby corrected as shown below:

Title page,
Item [54] and Column 1,
In the title, please change "NUMERICAL CONTROLLER" to --NUMERICAL CONTROL APPARATUS--.

Column 1,
Line 17, after "thereby" insert --,--.

Signed and Sealed this

Nineteenth Day of June, 2001

*Attest:*

*Attesting Officer*

NICHOLAS P. GODICI
*Acting Director of the United States Patent and Trademark Office*